US012624415B2

(12) United States Patent  
Karamalidis et al.

(10) Patent No.: US 12,624,415 B2  
(45) Date of Patent: May 12, 2026

(54) FUNCTIONALIZED ADSORBENTS FOR THE RECOVERY OF RARE EARTH ELEMENTS FROM AQUEOUS MEDIA

(71) Applicant: CARNEGIE MELLON UNIVERSITY, a Pennsylvania Non-Profit Corporation, Pittsburgh, PA (US)

(72) Inventors: Athanasios Karamalidis, Pittsburgh, PA (US); Newell R. Washburn, Pittsburgh, PA (US); Clinton W. Noack, Pittsburgh, PA (US); Kedar Perkins, Pittsburgh, PA (US); David A. Dzombak, Pittsburgh, PA (US)

(73) Assignee: CARNEGIE MELLON UNIVERSITY, a Pennsylvania Non-Profit Corporation, Pittsburgh, PA (US)

( * ) Notice: Subject to any disclaimer, the term of this patent is extended or adjusted under 35 U.S.C. 154(b) by 218 days.

(21) Appl. No.: 15/293,142

(22) Filed: Oct. 13, 2016

(65) Prior Publication Data

US 2017/0101698 A1 Apr. 13, 2017

Related U.S. Application Data

(60) Provisional application No. 62/494,656, filed on Aug. 16, 2016, provisional application No. 62/386,712, (Continued)

(51) Int. Cl.
| | |
|---|---|
| *C22B 3/24* | (2006.01) |
| *B01D 15/08* | (2006.01) |

(Continued)

(52) U.S. Cl.  
CPC ................ *C22B 3/24* (2013.01); *B01D 15/08* (2013.01); *B01D 15/3852* (2013.01); (Continued)

(58) Field of Classification Search  
CPC ........... C22B 59/00; C22B 3/24; B01D 15/08; B01D 15/3852; B01J 20/265; (Continued)

(56) References Cited

U.S. PATENT DOCUMENTS

| | | | | | |
|---|---|---|---|---|---|
| 6,093,376 | A | * | 7/2000 | Moore | .................... C01F 17/13 423/21.5 |
| 6,156,075 | A | * | 12/2000 | Nanbu | .................... C02F 1/683 8/115.65 |

(Continued)

OTHER PUBLICATIONS

Joris Roosen, Adsorption performance of functionalized chitosan-silica hybrid materials toward rare earths, J. Mater. Chem. A, 2014,2, 19415-19426). https://doi.org/10.1039/C4TA04518A (Year: 2014).*

(Continued)

*Primary Examiner* — Paul A Wartalowicz  
*Assistant Examiner* — Slone Elizabeth Simkins  
(74) *Attorney, Agent, or Firm* — Michael G. Monyok

(57) ABSTRACT

The disclosure relates to the design and synthesis of selected ligands, dendrimers, polymers and other solid phase substrates for selective chelation of rare earth elements (i.e. lanthanides), and use of those selective ligands for synthesis of resins, polymers and other types of solid supports for separation and recovery of lanthanides from aqueous media. Recovery of critical elements from aqueous media occurs in a simple two-step process: pre-concentration of REE on the adsorbent and recovery by acid elution. The present invention can be used for design of selective ligands immobilized on solid substrates for extraction of various constituents, (Continued)

such as lanthanides, actinides, radionuclides, trace metals, etc., from aqueous media.

13 Claims, 9 Drawing Sheets

Related U.S. Application Data filed on Dec. 10, 2015, provisional application No. 62/284,916, filed on Oct. 13, 2015.

(51) Int. Cl.

| | |
|---|---|
| *B01D 15/38* | (2006.01) |
| *B01J 20/26* | (2006.01) |
| *B01J 20/30* | (2006.01) |
| *B01J 20/32* | (2006.01) |
| *C02F 1/28* | (2023.01) |
| *C02F 101/00* | (2006.01) |
| *C02F 101/10* | (2006.01) |
| *C22B 59/00* | (2006.01) |

(52) U.S. Cl.
CPC ........... *B01J 20/265* (2013.01); *B01J 20/268* (2013.01); *B01J 20/3057* (2013.01); *B01J 20/3071* (2013.01); *B01J 20/3085* (2013.01); *B01J 20/3204* (2013.01); *B01J 20/321* (2013.01); *B01J 20/3242* (2013.01); *B01J 20/3259* (2013.01); *B01J 20/328* (2013.01); *C02F 1/288* (2013.01); *C22B 59/00* (2013.01); *C02F 2101/006* (2013.01); *C02F 2101/10* (2013.01); *Y02P 10/20* (2015.11)

(58) Field of Classification Search
CPC .. B01J 20/268; B01J 20/3057; B01J 20/3071; B01J 20/3085; B01J 20/3204; B01J 20/321; B01J 20/3242; B01J 20/3259; B01J 20/328; C02F 1/288
See application file for complete search history.

(56) References Cited

U.S. PATENT DOCUMENTS

| | | | | |
|---|---|---|---|---|
| 2005/0272116 A1* | 12/2005 | Ellison | .................... | B01J 45/00 |
| | | | | 530/416 |
| 2010/0144056 A1* | 6/2010 | Winnik | ............ | G01N 33/54353 |
| | | | | 436/501 |
| 2016/0010178 A1* | 1/2016 | Ogata | ................. | B01J 20/3475 |
| | | | | 524/612 |

OTHER PUBLICATIONS

Taylor-Pashow KML, Rocca JD, Lin W. Mesoporous Silica Nanoparticles with Co-Condensed Gadolinium Chelates for Multimodal Imaging. Nanomaterials. 2012; 2(1):1-14. (Year: 2012).*

A.S. Suneesh, K.V. Syamala, K.A. Venkatesan, M.P. Antony, P.R. Vasudeva Rao. Diglycolamic acid modified silica gel for the separation of hazardous trivalent metal ions from aqueous solution, Journal of Colloid and Interface Science, vol. 438, 2015, pp. 55-60. (Year: 2015).*

Liuqing Yang, "Synthesis and characterization of a series of chelating resins containing amino/imino-carboxyl groups and their adsorption behavior for lead in aqueous phase", Chemical Engineering Journal, vol. 168, Issue 1, 2011, pp. 115-124. (Year: 2011).*

Xiaodan Zhao, "Adsorption investigation of MA-DTPA chelating resin for Ni(II) and Cu(II) using experimental and DFT methods", Journal of Molecular Structure, vol. 986, Issues 1-3, 2011, pp. 68-74. (Year: 2011).*

Wei B, Li Y, Li H, Yu J, Ye B, Liang T (2013) Rare earth elements in human hair from a mining area of China. Ecotoxicol Environ Saf 1-696:118-123. https://doi.org/10.1016/j.ecoenv.2013.05.031 (Year: 2013).*

Yang, Liuqing & Li, Yanfeng & Wang, Liyuan & Zhang, Yun & Ma, Xiaojie & Ye, Zhengfang. (2010). Preparation and adsorption performance of a novel bipolar PS-EDTA resin in aqueous phase. Journal of hazardous materials. 180. 98-105. 10.1016/j.jhazmat. 2010.03.111. (Year: 2010).*

Yang, "Synthesis and characterization of a series of chelating resins containing amino/imino-carboxly groups and their adsorption behavior for lead in aqueous phase", J. Mater. Chem. A, 2014,2, 1530-1540 (Year: 2014).*

Loos, Cornelia & Syrovets, Tatiana & Musyanovych, Anna & Mailänder, Volker & Landfester, Katharina & Nienhaus, G & Simmet, Thomas. (2014). Functionalized polystyrene nanoparticles as a platform for studying bio-nano interactions. Beilstein journal of nanotechnology. 5. 2403-12. 10.3762/bjnano.5.250. (Year: 2014).*

Updated Citation—see previous Yang2014) Yang, Liuqing (2011). Synthesis and characterization of a series of chelating resins containing amino/imino-carboxyl groups and their adsorption behavior for lead in aqueous phase. Chemical Engineering Journal. 168. 115-124. 10.1016/j.cej.2010.12.048. (Year: 2011).*

Araki, K. et al. "Lanthanide-imprinted resins prepared by surface template polymerization." Journal of chemical engineering of Japan 33, No. 4 (2000): 665-668.

Branger, C. et al. "Recent advances on ion-imprinted polymers." Reactive and Functional Polymers 73, No. 6 (2013):859-875.

Chauvin, A. et al. "Use of Dipicolinate-Based Complexes for Producing Ion-Imprinted Polystyrene Resins for the Extraction of Yttrium-90 and Heavy Lanthanide Cations." Chemistry—A European Journal 12, No. 26 (2006): 6852-6864.

Garcia, R. et al. "Solid-liquid lanthanide extraction with ionic-imprinted polymers." Separation Science and Technology 37, No. 12 (2002): 2839-2857.

Kala, R. et al. "Preconcentrative separation of erbium from Y, Dy, Ho, Tb and Tm by using ion imprinted polymer particles via solid phase extraction." Analytica chimica acta 518, No. 1 (2004): 143-150.

Raiado-Pereira, L. et al. "Grafting hydrophobic and affinity interaction ligands on membrane adsorbers: A close-up "view" by X-ray photoelectron spectroscopy." Separation and purification technology 93 (2012): 75-82.

Shirvani-Arani, S. et al. "Synthesis of nano-pore samarium (III)-imprinted polymer for preconcentrative separation of samarium ions from other lanthanide ions via solid phase extraction." analytica chimica acta 623, No. 1 (2008): 82-88.

Vigneau, O. et al. "Ionic imprinted resins based on EDTA and DTPA derivatives for lanthanides (III) separation." Analytica chimica acta 435, No. 1 (2001): 75-82.

Vigneau, O. et al. "Solid-liquid separation of lanthanide/lanthanide and lanthanide/actinide using ionic imprinted polymer based on a DTPA derivative." Chemistry letters 31, No. 2 (2002): 202-203.

* cited by examiner

FIG. 5

FUNCTIONALIZED ADSORBENTS FOR THE RECOVERY OF RARE EARTH ELEMENTS FROM AQUEOUS MEDIA

CROSS-REFERENCE TO RELATED APPLICATIONS

This application claims the benefit under 35 U.S.C. § 119 of Provisional Application Ser. No. 62/284,916, filed Oct. 13, 2015, Provisional Application Ser. No. 62/386,712, filed Dec. 10, 2015, and Provisional Application Ser. No. 62/494, 656, filed Aug. 16, 2016, each of which is incorporated herein by reference.

STATEMENT REGARDING FEDERALLY SPONSORED RESEARCH

This invention was made with government support under Grant No. DE-EE0006749 awarded by the Department of Energy. The government has certain rights in the invention.

BACKGROUND OF THE INVENTION

This invention relates generally to the recovery of rare earth elements from aqueous media. More specifically, this invention relates to the design and synthesis of solid phase substrates that can be used to recover specific rare earth elements from aqueous media containing various components.

Rare Earth Elements (REE) constitute a group of chemically similar metals in the lanthanide series plus Yttrium and Scandium. REE are a critical part of modern energy technologies and electronics. However, REE are highly dispersed in the earth's crust, making it costly and difficult to extract and concentrate them for industrial use. The high demand of the use of REE in advanced energy technologies makes urgent the need for alternative approaches for REE separation and recovery from different matrices compared to traditional mining and extraction operations. Aqueous media such as natural waters, sea water, brines, and waste waters produced from conventional oil/gas and shale gas extraction or thermal energy operations, offer a new opportunity for recovery of REE.

Separation techniques for lanthanides and actinides from water have been employed in various industries, such as nuclear power generation. However, most of those strategies target the separation of actinides from lanthanides but they do not address the challenges of separating individual lanthanide elements and do not attempt to separate REE present at low concentration in hypersaline water, such as brines. In other words, recovering REEs from complex aqueous media is challenging because existing separation technologies for REE are not adequately selective or involve many chemical steps which increase the overall cost of the process.

Ionic Imprinted Polymer (IIP) is an effective way to separate one REE element from other REE, such as selectively absorbing Gd from La. IIP utilizes metal ions as a template and imprinting the size and/or shape of the ions into the polymer by the process of polymerization. A properly formed polymer will selectively form bonds with the target ions rather than interfering ions due, thus separating target ions from other ions with similar properties. However, the various methods of IIP synthesis suffer from drawbacks, especially when used in complex or low-concentration solutions. For example, using a chemical immobilization method of synthesis, the loading rate is around 10% or less because the ligand can be blocked by the bulk structure of the polymer and the template ion cannot be leached out during the acid washing, making the ligand unavailable for ions in solution.

Although IIPs can be developed for most REE, the effectiveness can vary across depending on the element being targeted. For example, Er-IIP has a mediocre selectivity and the separation factor is around 5 for Y, Dy, Ho, Tb, Tm. In addition, the IIPs for Gd, Tm, and Y have the highest selectivity not to the template element, but another one. For example, Gd-IIP has the highest selectivity to Eu instead of Gd. In addition, many IIPs are designed to attract medium or heavy REEs, except Nd-IIP. It is a challenge to develop an IIP for light elements such as La.

Ligands have also been used to bind REE. Use of ligands has typically focused on simple systems containing low concentrations of background electrolytes and high sorbate concentrations. However, extraction from complex solutions, such as brines, that contain low levels of REE requires selective, high-capacity adsorbents in order to be effective and economical.

Rare earth elements are abundant in Earth's crust but are highly dispersed. Currently the global production of rare earth elements is based on mining ore deposits and processing and refining of the mining extracts. However, different types of water (for example, seawater, groundwater, tailings, etc.) contain levels of rare earth elements. Traditional mining techniques would be unable to recover these elements. It would therefore be advantageous to develop materials that can concentrate and extract REE from aqueous media.

BRIEF SUMMARY

According to one embodiment of the present invention is a functionalized adsorbent used for extracting rare earth elements from aqueous solutions. The adsorbent comprises a solid substrate with a rare earth element (REE)-attractive material disposed on the surface of the substrate. Solid-phase extraction (SPE) of REEs from aqueous matrices has desirable advantages relative to other separation techniques, such as liquid-liquid separation or co-precipitation, because consumption of reagents is limited, the separations can be performed rapidly with few process steps, and SPE can be scaled-up more easily. In one embodiment, ion imprinted polymers produce consistent, selective recovery of REEs from a range of aqueous matrices. In alternative embodiments, ligands are adhered to the surface of a substrate.

Further disclosed herein is the synthesis of selected solid phase substrates for the selective chelation of rare earth elements. The solid phase substrates are used in a two-step process to recover certain REEs: first, REEs are pre-concentrated on a surface of the solid phase substrate; next, the REEs are recovered by acid elution, which separates the REE from the substrate. After acid elution, the adsorbent can be used again. The adsorbents can recover lanthanides from seawater, brines, groundwater, tailings, and other aqueous media. With the proper selection of the attractive material, they can also be used for the extraction of various other materials such as actinides, radionuclides, and trace metals.

3

Figure 3:
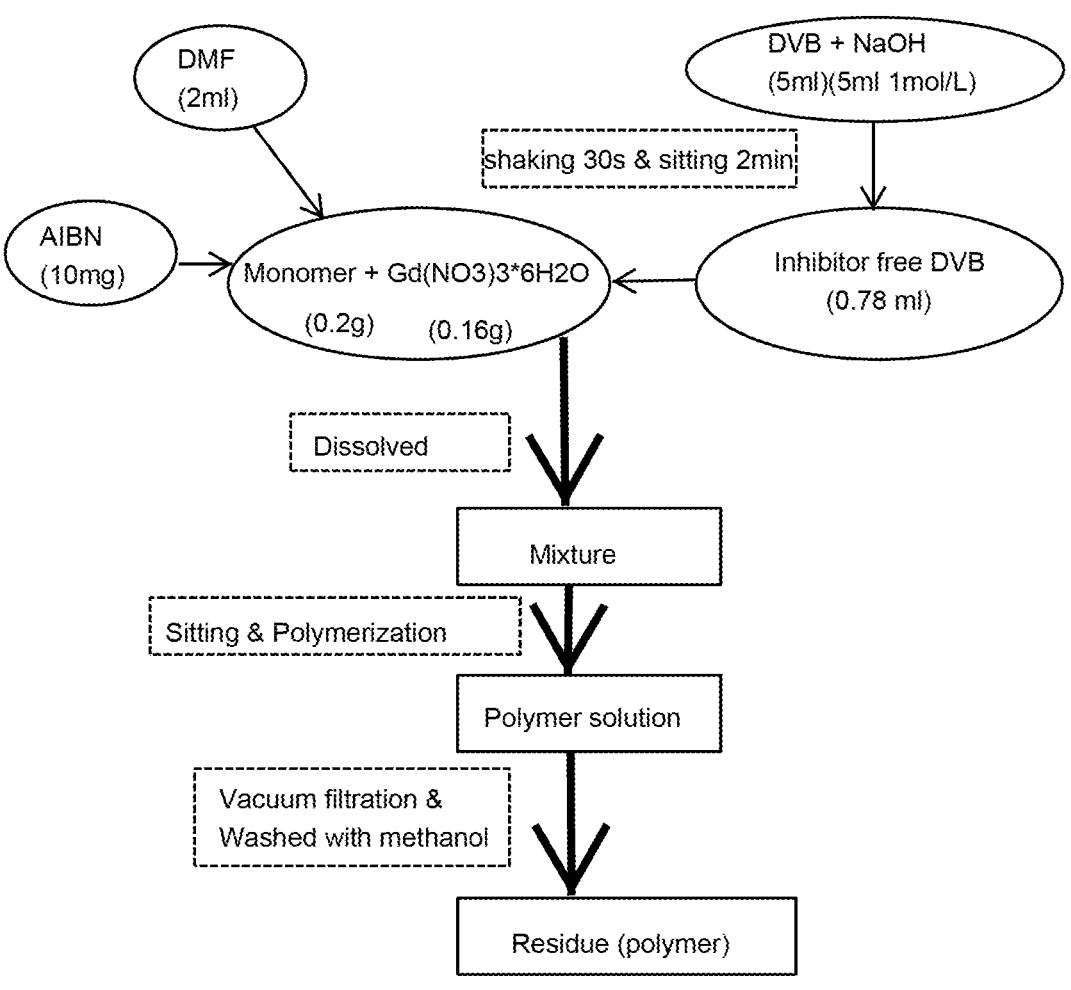

FIG. 3 shows the flow diagram of the polymerization of IIP, according to one embodiment.

Figure 4:
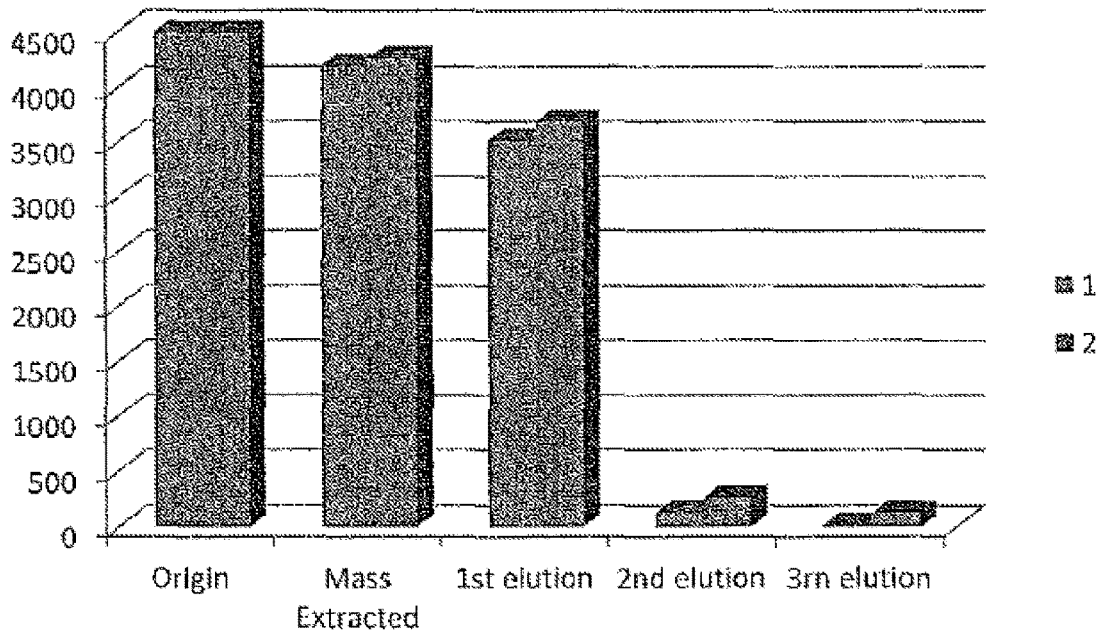

FIG. 4 is a graph showing recovery of various rare earth elements.

Figure 5:
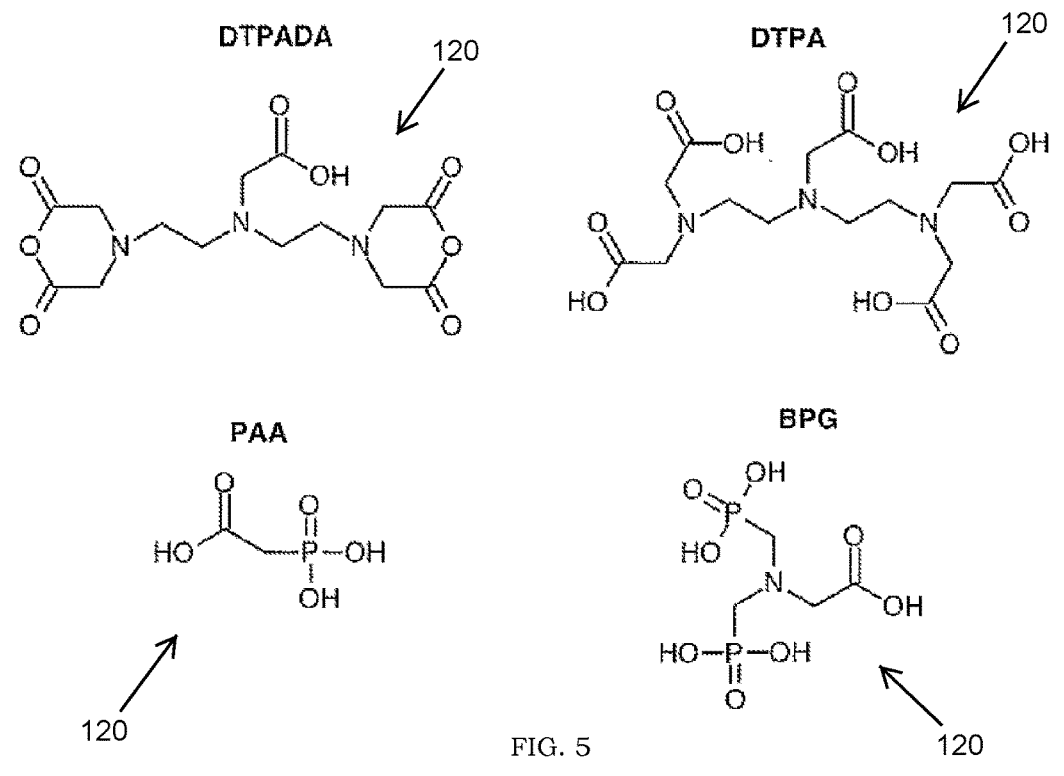

FIG. 5 depicts the structure of various ligands.

Figures 6, 7:
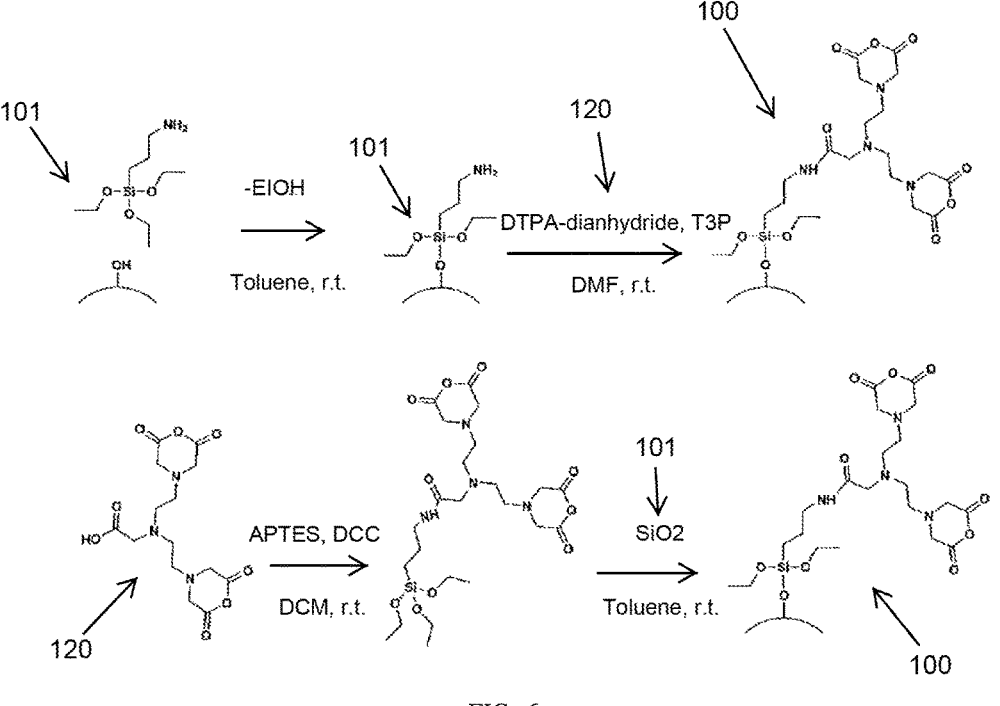

FIG. 6 is a representation of functionalization methods, according to various embodiments.

FIG. 7 is a graph showing acid-base titration curves for adsorbents according to embodiments of the invention.

Figure 8:
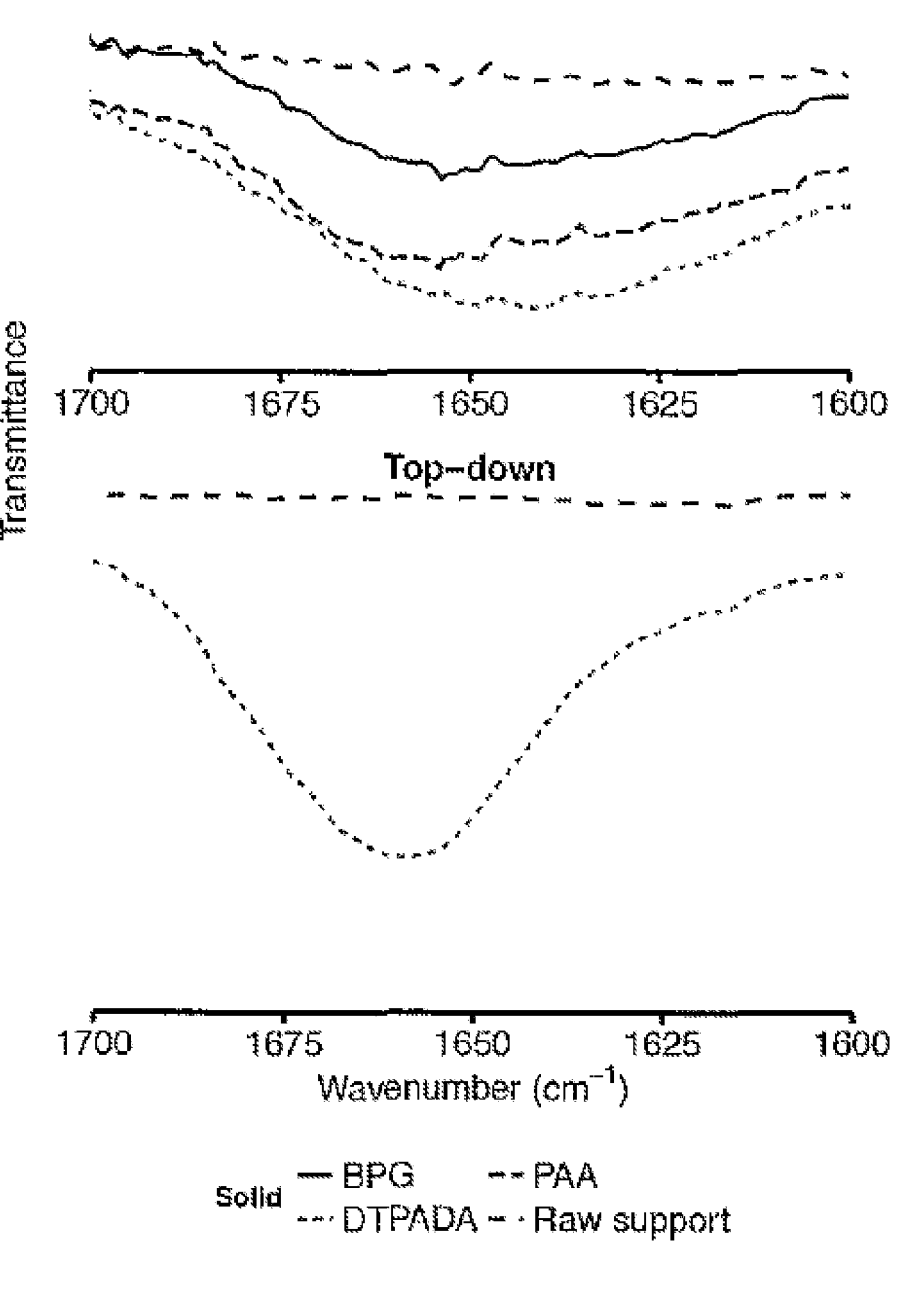

FIG. 8 depicts characterization of the absorbent according to one embodiment.

Figure 9:
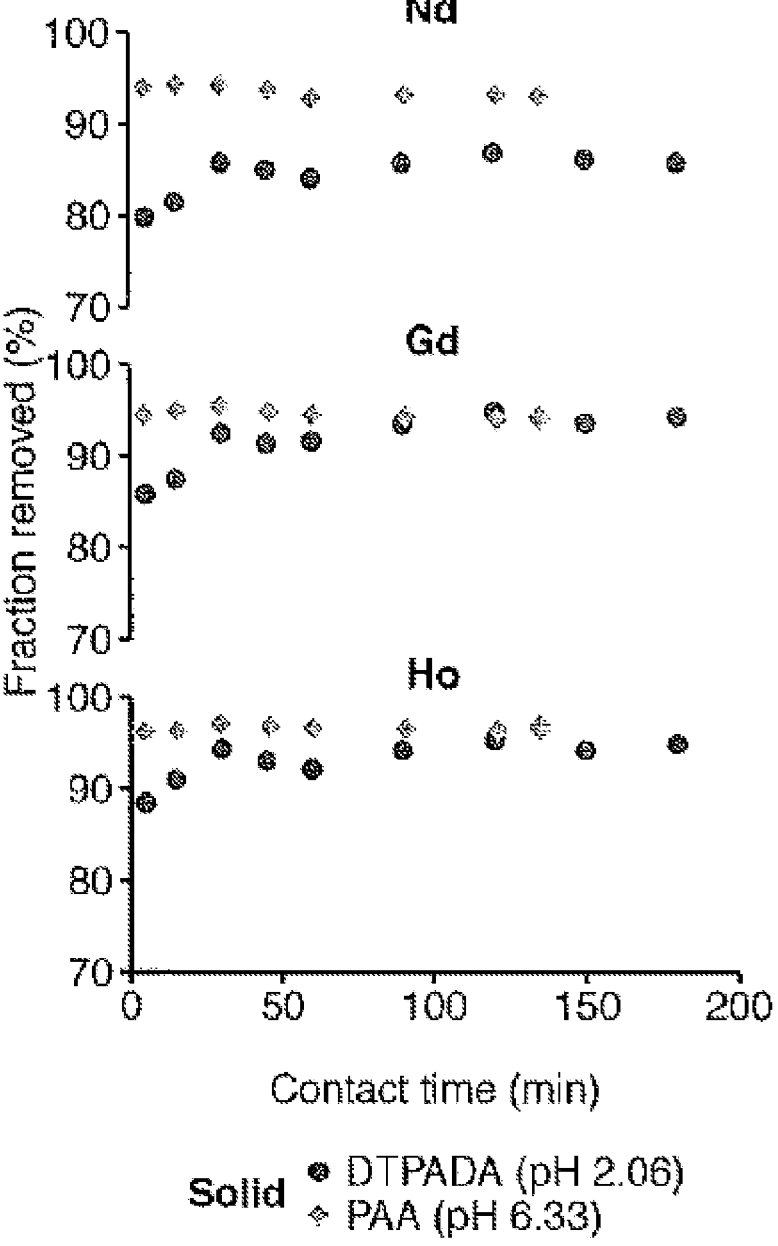

FIG. 9 depicts characterization of the absorbent by an alternative method.

Figure 10:
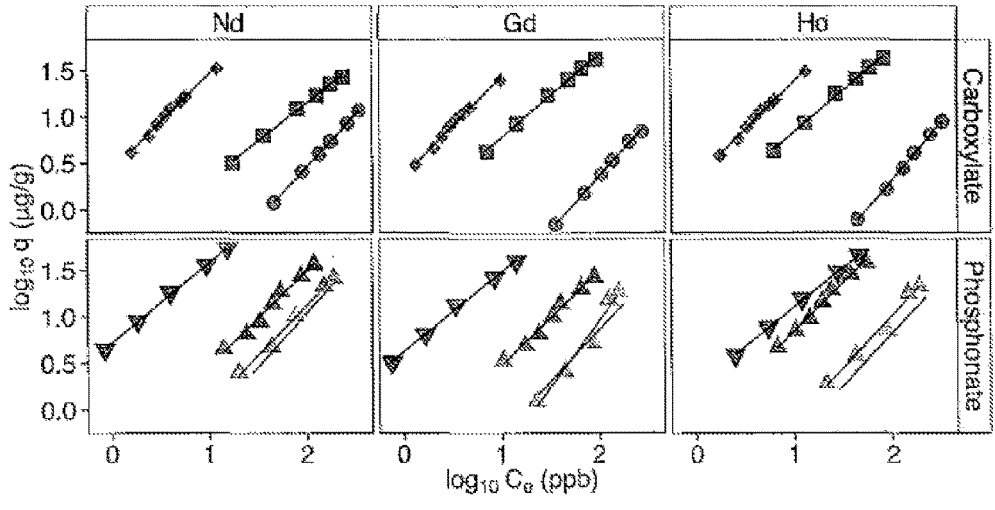
Figure 10:
Figure 10:
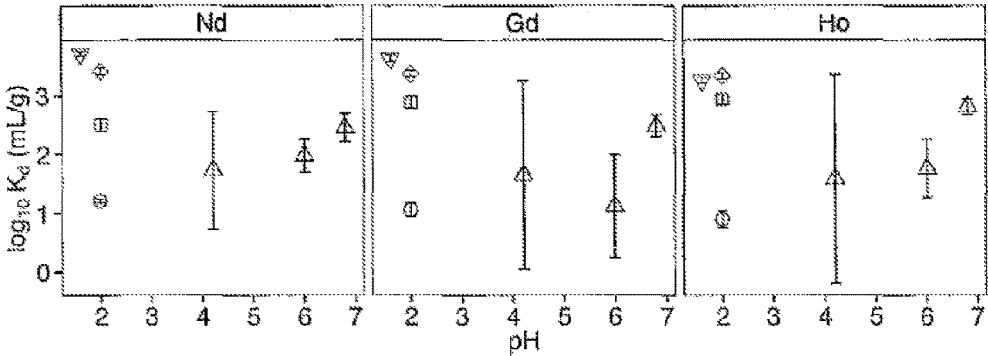

FIG. 10 depicts characterization of the absorbent by an alternative method.

DETAILED DESCRIPTION

In one embodiment, ion imprinted polymers (IIP) 110 are tethered to surfaces of solid substrates 101, creating a functionalized adsorbent 100. In alternative embodiments, rare earth element (REE)-reactive ligands 120 are attached to the substrate 101, which can include silica and sulfonated polystyrene, for example. By attaching the REE-attractive material 110, 120 to the surface, a high-surface area adsorbent 100 is created that has specific binding sites for REE.

Figure 1:
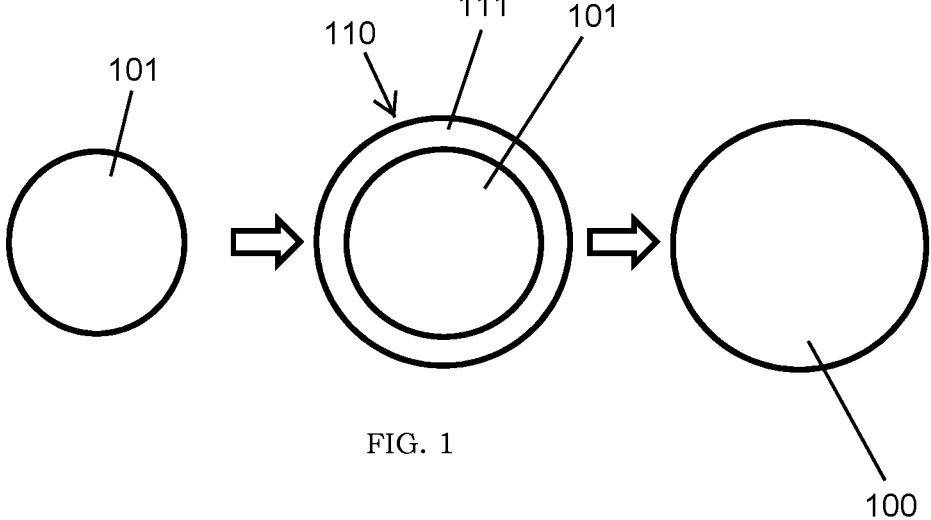
FIG. 1 illustrates a processing strategy for preparation of high surface-area adsorbents based on an IIP-coated substrate, according to one embodiment.

According to one embodiment, a solvent exchange process is optimized for coating the IIP 110 onto the substrate 101, as shown schematically in FIG. 1. The IIP 110, which initially contains template REE ions 111, is dissolved in toluene, methylene chloride, or another suitable solvent for the IIP 110. After mixing the IIP 110 solution with the substrate 101, a second solvent, such as diethyl ether, in which the IIP 110 is insoluble, is slowly added, causing a controlled deposition of the IIP 110 onto the surface of the substrate 101. After coating is completed, the substrate 101 is isolated and the REE template ions 111 are extracted, resulting in a high surface-area solid substrate 101 capable of binding REEs in solution with high specificity.

In one embodiment, silica beads are used as the substrate 101 because of their ease of functionalization with the IIP 110 or other REE-attractive material. Surface hydroxyl groups are used for the attachment of organo-silanes. The most common silane, because it allows for facile attachment of amino-polycarboxylic acids, is aminopropyl triethoxysilane (APTES; 22). Additionally, silica gels are resistant to dissolution under acidic conditions, limiting the potential for degradation of the adsorbent with repeated uptake and elution cycles. In many instances, silica beads are commercially available with reactive carboxylic acid and amine groups, for example. In an alternative embodiment, sulfonated polystyrene is readily available with carboxylic acid groups present in the form of imidoacetate moieties and can be readily aminated by diamine functionalization using simple modification chemistries. With both materials (silica and polystyrene), the substrate 101 is chemically robust under a broad range of conditions and can be regenerated repeatedly.

Figure 2:
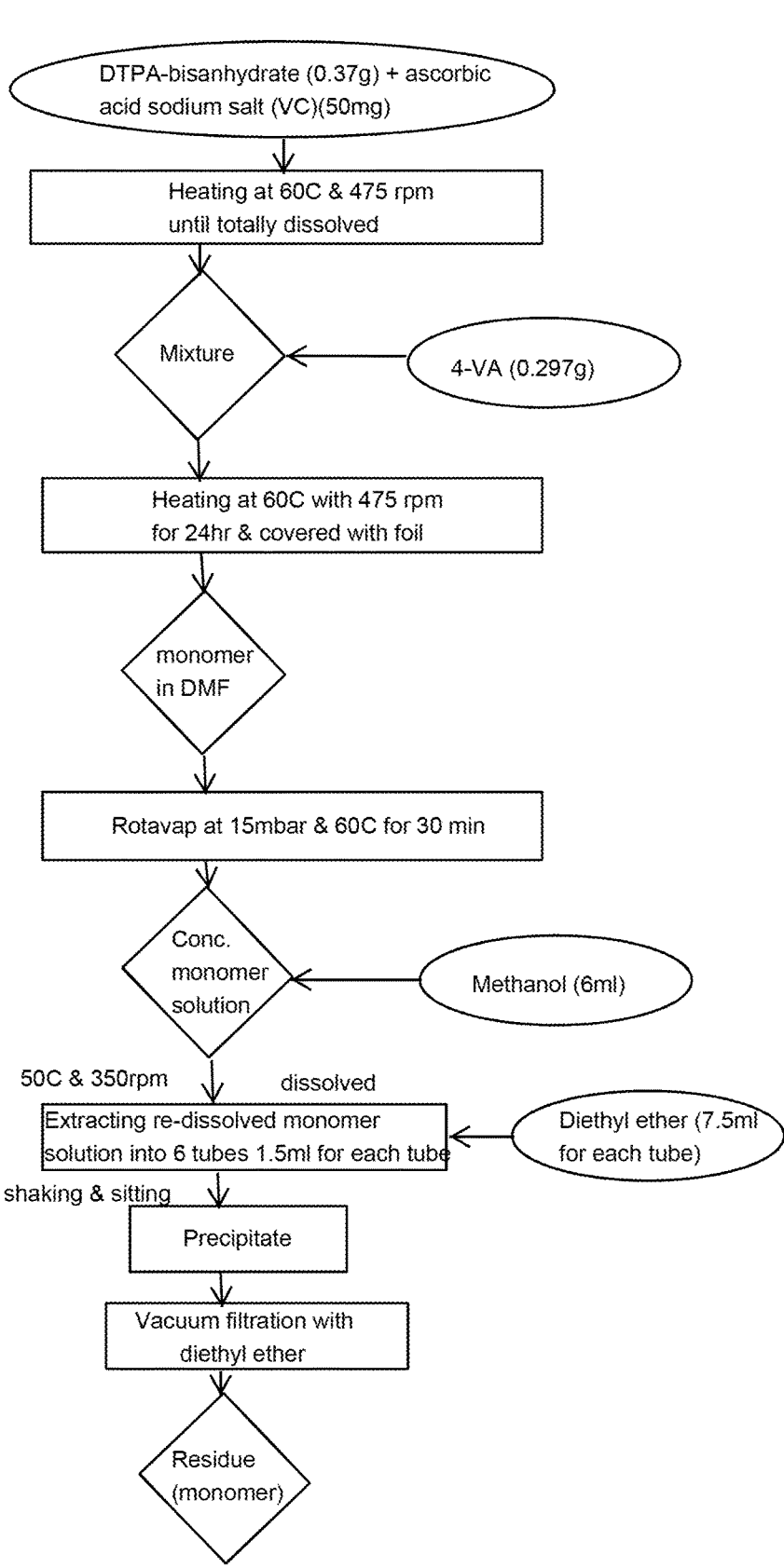
FIG. 2 is a flow diagram of the synthesis of the monomer.

To create an IIP 110 suitable for deposition on the substrate 101, the following process steps, according to one example embodiment, are completed:

1. Synthesis of monomer (Dimethylformamide (DMF) based synthesis) (See FIG. 2)

a) To avoid oxidation, a small amount (~50 mg) of ascorbic acid sodium salt (VC) is added into a round bottom flask (250 mL) along with 0.37 g of DTPA-bisanhydride.

b) 30 mL of DMF is added into the flask by pipette to dissolve the solids and then the mixture is heated to 60° C. and stirred (475 rpm) until the solids are completely dissolved.

c) 0.297 g of 4-Ethynylaniline (4-VA) is added to the solution dropwise by syringe and the mixture is heated and stirred for an extended period at 60° C. During this period, the round bottom flask is sealed with rubber cap and covered with aluminum foil to avoid oxygen and exposure to light, which could degrade the materials.

d) After about 24 hours of reaction, the monomer solution with DMF is condensed using Rotavap (P: 15 mbar and T: 60° C.) for about 30 minutes until it becomes viscous/sticky.

e) At this stage, the concentrated monomer is re-dissolved in 6 mL of methanol. The flask is heated at 50° C. for about half an hour with stirring until all of the crude products are dissolved in the methanol again.

f) To precipitate the monomer, re-dissolved monomer solution is extracted and added into several clean centrifuge tubes. 7.5 mL of diethyl ether is added gently into each of the tubes. The solution is left sitting to allow precipitation.

g) The precipitates are separated by vacuum filtration and washed with diethyl ether.

2. Polymerization of IIP (as shown in FIG. 3)

a) 0.2 g of the monomer and 0.16 g of $Gd(NO_3)_3$ re added into a tube and 2 mL of methanol is added to dissolve.

b) 5 mL Divinylbenzene (DVB) and 5 mL 1 mol/L NaOH solution is added into a tube, causing the liquid to separate. The supernatant layer is a colorless transparent liquid containing inhibitor-free DVB.

c) 0.78 mL of inhibitor-free DVB and 10 mg of 2,2-Azobisisobutyronitrile (AIBN) are added to the solution, which causes the mixture to begin to polymerize.

d) After several days of polymerization, the crude polymer is extracted by vacuum filtration and washed by methanol.

3. Cleaning polymers: Two different methods are presented to clean the polymer 110. In a first method, the polymer powder is dried in an oven at 65° C. for 30 minutes, then cooled to room temperature. To remove the chelated Gd ions from the IIP 110, 1 mol/L HCl is used for acid rinsing. In a second method, the IIP 110 is subjected to acid rinsing first. After rinsing, the polymers 110 are washed with deionized water until the pH of its filtrate was adjusted to 5.10 (or above). The IIP 110 is then left to dry.

After polymer synthesis, the IIP 110 is deposited onto the substrate 101 according to the solvent exchange method previously described. In addition, once the IIP 110 is fabricated, testing can corroborate proper functionalization. An example testing protocol, according to one embodiment, comprises preparing a stock REE solution, mixing the IIP 110 in the solution, and measuring the amount of REE bound to the IIP 110. Pursuant to this testing procedure, Gd-IIP and its filtrates were analyzed by inductively coupled plasma mass spectrometry (ICP-MS) in high energy Helium mode (HEHe). The results of the testing are shown in the following table, with the results also shown in FIG. 4

| Sample 1 | |
| --- | --- |
| 87.74% | Total Gd Recovered. |
| 83.91% | Recovery (1st elution) |
| 3.18% | Recovery (2nd elution) |
| 0.65% | Recovery (3rd elution) |

-continued

| Sample 2 | |
|---|---|
| 96.00% | Total Gd Recovered |
| 86.65% | Recovery (1st elution) |
| 6.29% | Recovery (2nd elution) |
| 3.06% | Recovery (3rd elution) |

While the following examples have been described in specific quantities of materials, a person having skill in the art will appreciate that the basic procedural steps can be replicated with different amount of materials, particularly if the process is scaled for commercial production.

In an alternative method, silica gel substrates 101 are functionalized with REE-reactive ligands 120, including diethylenetriaminepentaacetic acid (DTPA), diethylenetriaminepentaacetic dianhydride (DTPADA), phosphonoacetic acid (PAA), and N,N-bisphosphono(methyl)glycine (BPG), for example. The structures of the ligands 120 are illustrated in FIG. 5.

In these alternative embodiments, the substrates 101 are functionalized using either 3-aminopropyl silica gel (d: 75-ISO m) or high-purity silica gel (d: 150-250 m). In one embodiment, ligands 120 are grafted to the surface of the substrate 101 through the formation of an amide bond between a free carboxyl group and the surface amines. The related ligands 120 DTPADA and DTPA were chosen to compare the effects of forming a targeted amide tether to the surface (i.e. on the lone carboxyl of the DTPADA) to the non-specific coupling with DTPA. The use of propylphosphonic anhydride (T3P) and N,N'-dicyclohexylcarbodiimide (DCC) for amide formation promotes the reaction at the free carboxyl over the anhydride. Upon introduction to an aqueous environment, the anhydride groups hydrolyze to leave four carboxyl groups free in solution.

Two schemes for functionalization of the substrate 101 can be employed. In one embodiment, pre-aminated silica gel substrates 101 are functionalized via a "bottom-up" scheme, building functional moieties piece by piece from the surface. In an alternative embodiment, a "top-down" scheme is employed by first forming a ligand-functionalized silane, which is subsequently attached to a silica gel substrate 101. The procedure for each scheme is illustrated schematically in FIG. 6, with the bottom-up approach shown in the top of FIG. 6.

The following disclosure describes synthesis via the bottom-up functionalization process, according to one example embodiment. In this embodiment, a solution of the desired ligand 120 (128 mM), 4-dimethylaminopyridine (4-DMAP; 154 mM), 3-aminopropyl functionalized silica (25.7 mM amine), and T3P (77.1 mM) in dimethylformamide (DMF; 35 ml, total volume) is stirred at room temperature (~15-25° C.) for a period of several hours. The suspension is then transferred to a centrifuge tube and centrifuged for 15 minutes at 25° C. The supernatant is removed, leaving a pellet comprising the adsorbent 100. Optionally, the pellet is resuspended in 25 ml of DMF and centrifuged for 10 minutes. After this second centrifuge stage, the supernatant removed and the pellet can be resuspended for additional centrifuge separations in DMF.

In yet another alternative embodiment, the adsorbent 100 is created in a top-down scheme. An example of the top-down process is described as follows. First, diethylenetriaminepentaacetic dianhydride (2.5 g, 7.0 mmol) and DCC (1.6 g, 7.7 mmol) are added to a flask. The flask is then filled with dichloromethane (25 mL) and (3-Aminopropyl)triethoxysilane (APTES) (1.8 mL, 7.7 mmol) and stirred for a period of several hours. The reaction solution is then filtered and concentrated under vacuum. This product was then added to 1.62 g of substrate 101 in dry toluene (25 ml) and stirred for a period of several hours. The final product is washed multiple times with toluene, multiple times with tetrahydrofuran, and multiple times with warm water and dried in a vacuum oven (65° C.).

As with the adsorbent 100 created with IIP 110, the adsorbent 100 utilizing ligands 120 can be characterized to determine if it was adequately functionalized by the various ligands. For example, the formation of amide bonds between the surface amines and the desired ligand 120 results in a shift of surface acid-base chemistry from highly basic (amine $pK_a$~9-10) to acidic (ligand $pK_{a1}$~2). This shift can be investigated by rapid acid base titrations of particle suspensions. This shift can also be tested by inferring surface charge from electrophoretic mobility measurements. Additionally, the presence of the desired amide tether can be confirmed by attenuated total reflectance-Fourier transform infrared spectroscopy (ATR-FTIR).

Further, adsorbent 100 REE reuptake can be quantified through a series of measurements. The measurements determine the reactivity of the functionalized adsorbents 100 under a variety of conditions and probe a variety of adsorbent properties including: uptake kinetics, pH dependance, and affinity.

As an example, acid-base titrations of an adsorbent 100 according to one embodiment demonstrated a significant shift from highly basic (dominated by amines) to highly acidic (dominated by carboxyl groups (see FIG. 7). In addition to starting as a more acidic suspension, a DTPA-based adsorbent 100 showed approximately four times greater base neutralizing capacity (from pH~4-8) than did a DTPADA-based adsorbent 100, caused by a greater grafting density of the DTPA, owing to its flexibility of attachment site. The rigid conformation of the DTPADA attachment may create steric hindrances to greater grafting densities.

By way of further example, infrared spectroscopy can be used, via ATR-FTIR, to investigate the chemistry of the surface functionalization of the adsorbent 100. FIG. 8 shows the presence of the expected amide bond in all samples studied ($V_{c=0, \, amide}$≈1650 cm$^{-1}$). These spectra, along with the previously presented characterization data, indicate that the functionalization was successful via the proposed attachment scheme.

Referring again to the figures, FIG. 9 shows the rapid uptake (within 5 minutes) of the REE by both the DTPADA-based and PAA-based adsorbents 100. A pseudo equilibrium was reached in each of these tests in under one hour, indicating that the desirable, short contact times allowed with these materials. The mono-dentate PAA adsorbent 100 had notably more rapid kinetics than the more complex, and multi-dentate DTPADA adsorbent 100, reaching a steady removal after just 5 minutes of mixing.

By way of further example of adsorbent 100 characterization, adsorption isotherms were used to quantify the affinity of the surface-attached ligands for the REE under a range of conditions. The performance of the adsorbents 100 with four different ligands are compared in FIG. 10 on the uptake of Nd, Gd, and Ho from 0.5 m NaCl. In FIG. 10, a more reactive adsorbent 100 plots further to the left.

As can be concluded from the adsorption edge data, it is apparent that the ability to attach the DTPA at a single carboxyl group (by performing the synthesis with the dianhydride form) offers benefits over a functionalization scheme using the acid-form. This likely results from two factors. First, the high affinity for DTPA towards the REE in solution is based on the ability of the ligand to form a highly-coordinated "cage" around the metal. This mechanism utilizes all five of the carboxyl groups in solution to maximally coordinate the ion. The attachment of the ligand 120 to a surface at any of the carboxyl groups will alter the ability to coordinate the REE ions.

This "penalty" is limited by attaching at the lone carboxyl group, emanating from the central, tertiary amine of the DTPA molecule. Stated differently, the potential for the attachment of the acid-form DTPA at any of its carboxyl groups results in surface groups that are sterically hindered from forming the desired coordination geometry, and thus relies primarily on electro-static interactions with the ion. Alternatively, because there are no protected carboxyl groups in the acid-form molecule, there is a potential for multiple carboxyl groups from the same molecule to attach to the surface via amide bonds.

Thus, the characterization validates the affinity of surface-attached ligands 120 for REE using a substrate 101 and various attachment schemes. Silica gel substrates 100 functionalized with REE-reactive ligands 120 can be synthesized and characterizated by a suite of techniques to confirm successful synthesis. Batch adsorption testing determines the performance of the adsorbents 100 under environmentally relevant sorbate concentrations. Multi-dentate ligands, DTPADA and BPG yielded the most reactive functionalized adsorbents 100 (average Kd=2413 and 3829 mL/g for DTPADA and BPG respectively), were chemically and physically robust (no loss of performance after aggressive acid and base washes followed by heated dessication), and regeneratable (>80 elution of REE from DTPADA in a single step). However, amino-polycarboxylic acid adsorbents showed limited uptake at mid-range pH and low-sorbate concentrations. As a potential remedy to this observation an alternative functionalization scheme was employed to limit excess surface amines and an improvement is observed with respect to mid-ranged pH uptake. The characterization highlights the complexity of inter-molecular interactions between even moderately sized reactive sites when developing high-capacity, high-selectivity adsorbents 100.

While the disclosure has been described in detail and with reference to specific embodiments thereof, it will be apparent to one skilled in the art that various changes and modification can be made therein without departing from the spirit and scope of the embodiments. Thus, it is intended that the present disclosure cover the modifications and variations of this disclosure provided they come within the scope of the appended claims and their equivalents.

What is claimed is:

1. A method of recovering a rare earth element from aqueous media, comprising:
   providing an adsorbent, wherein the adsorbent comprises:
      a substrate comprising sulfonated polystyrene having an amine derived from diamine functionalization of imidoacetate moieties, wherein the substrate is acid and base resistant, and
      a material having at least one carboxyl group and a plurality of anhydride groups attached to a surface of the substrate through an amide bond between the carboxyl group on the material and the amine on the substrate,
      wherein the plurality of anhydride groups hydrolyze to form additional carboxyl groups in an aqueous environment, wherein the material selectively binds with at least one rare earth element in an aqueous solution via at least one additional carboxyl group on the surface-bound material;
   exposing the adsorbent to the aqueous media, wherein the rare earth element binds to the material on the surface of the substrate;
   rinsing the adsorbent in an acid; and
   recovering the rare earth element from the acid.

2. The method of claim 1, further comprising:
   exposing the adsorbent to the aqueous media after rinsing the adsorbent in the acid;
   rinsing the adsorbent again in a second acid; and
   recovering the rare earth element from the second acid.

3. The method of claim 1, wherein the material is a ligand.

4. The method of claim 3, wherein the ligand comprises diethylenetriaminepentaacetic dianhydride.

5. The method of claim 3, wherein providing an adsorbent comprises:
   adding diethylenetriaminepentaacetic dianhydride and N,N'-dicyclohexylcarbodiimide to a container;
   adding dichloromethane and (3-Aminopropyl)triethoxysilane to the container;
   filtering contents of the container to obtain the ligand;
   adding the ligand, dry toluene, and the substrate to a second container; and
   washing the substrate containing the ligand with toluene, then tetrahydrofuran, and then water.

6. An adsorbent comprising:
   a substrate comprising sulfonated polystyrene having an amine derived from diamine functionalization of imidoacetate moieties,
      wherein the substrate is acid and base resistant; and
   a material having at least one carboxyl group and a plurality of anhydride groups attached to a surface of the substrate through an amide bond between the carboxyl group on the material and the amine on the substrate,
      wherein the anhydride groups hydrolyze to form additional carboxyl groups in an aqueous environment,
      wherein the material selectively binds with at least one rare earth element in an aqueous solution via at least one additional carboxyl group on the surface-bound material.

7. The adsorbent of claim 6, wherein the material is a ligand.

8. The adsorbent of claim 7, wherein the ligand comprises diethylenetriaminepentaacetic dianhydride.

9. The adsorbent of claim 7, wherein the ligand is created by:
   adding diethylenetriaminepentaacetic dianhydride and N,N'-dicyclohexylcarbodiimide to a container;
   adding dichloromethane and (3-Aminopropyl)triethoxysilane to the container; and
   filtering contents of the container to obtain the ligand.

10. The adsorbent of claim 6, wherein the material is diethylenetriaminepentaacetic dianhydride and the carboxyl group emanates from a central, tertiary amine of the diethylenetriaminepentaacetic dianhydride.

11. The adsorbent of claim 6, wherein the adsorbent is reusable after acid elution.

12. An adsorbent for use in an aqueous environment comprising:
   a substrate consisting of polystyrene functionalized with an amine, and a material attached to a surface of the substrate through an amide bond between a single carboxyl group on the material and a single amine on the surface of the substrate, wherein the material comprises a plurality of anhydride functional groups, wherein the material selectively binds with at least one rare earth element via at least one additional carboxyl group formed on the surface-bound material from the anhydride functional groups in the aqueous environment.

13. The adsorbent of claim 12, wherein the material is diethylenetriaminepentaacetic dianhydride and the single carboxyl group emanates from a central, tertiary amine of the diethylenetriaminepentaacetic dianhydride.

\* \* \* \* \*